United States Patent Office 2,954,053
Patented Sept. 27, 1960

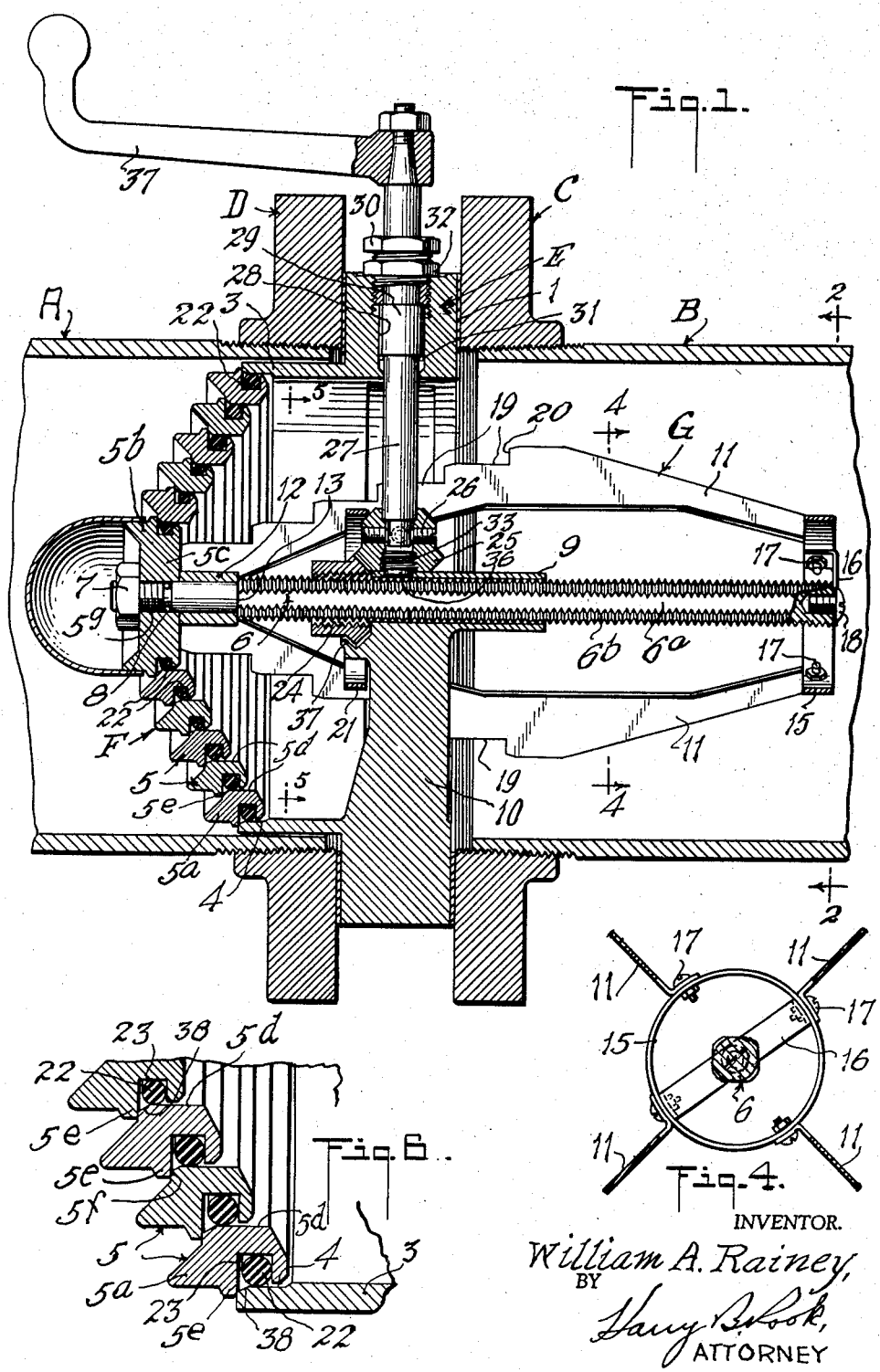

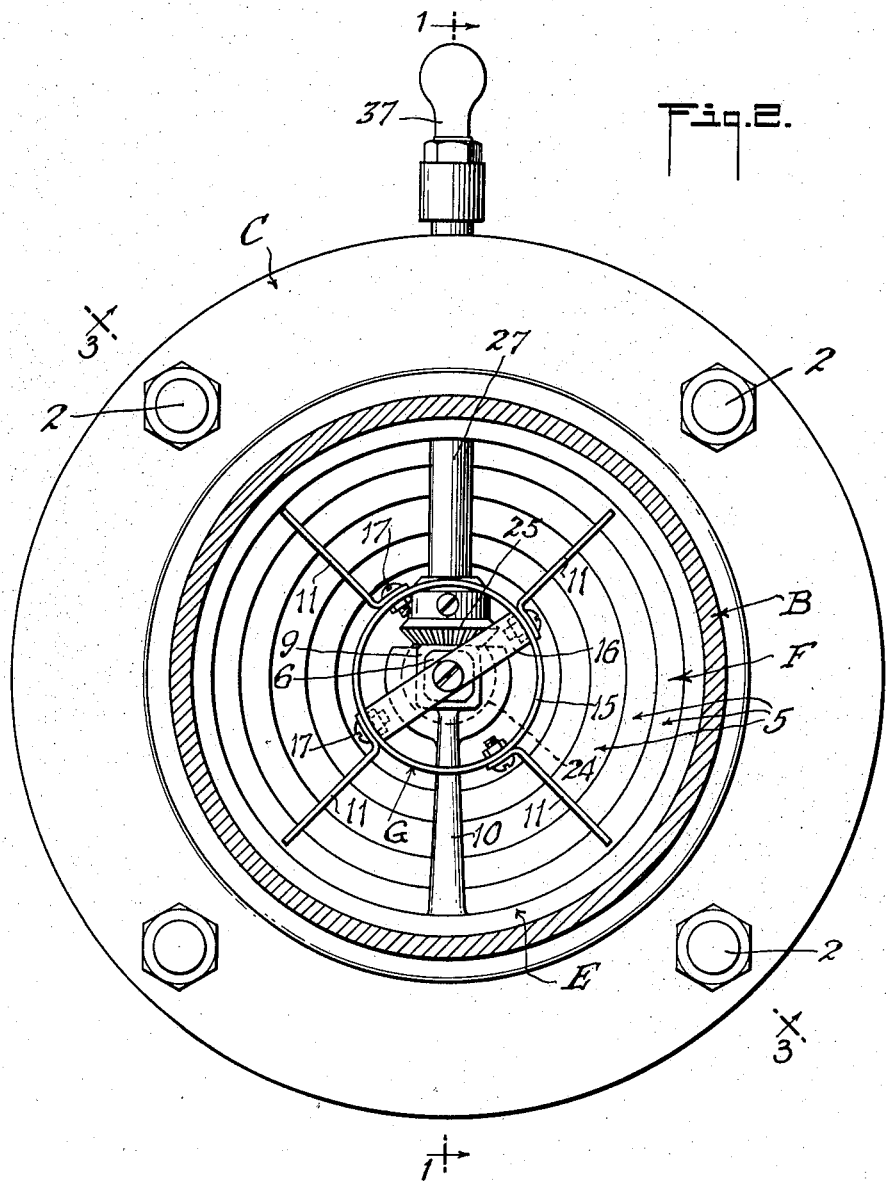

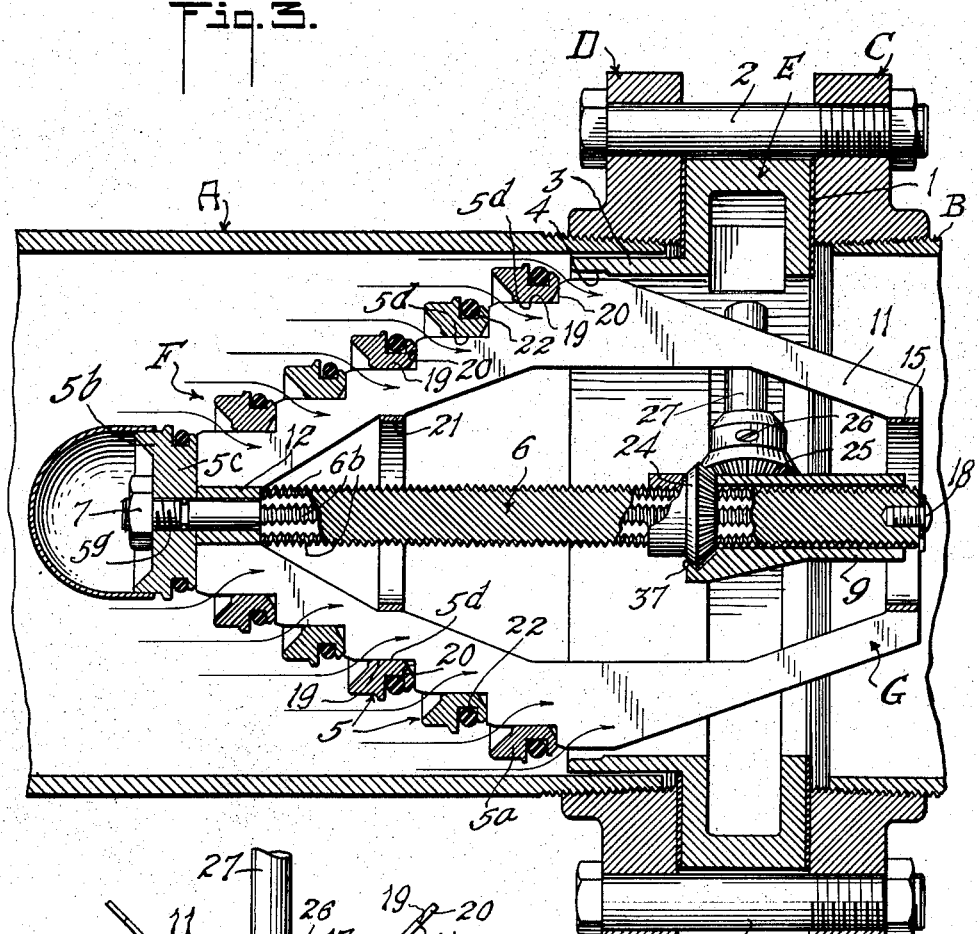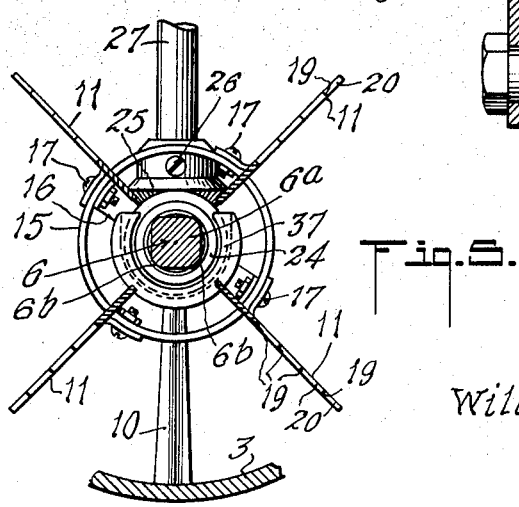

2,954,053
VALVE

William A. Rainey, Cranford, N.J., assignor to H. K. Porter Company, Inc., Roselle, N.J., a corporation of Delaware Filed Dec. 30, 1957, Ser. No. 705,925

4 Claims. (Cl. 137—630.15)

This invention relates in general to a device having the general nature of a valve to control the flow of fluid in a pipe, and a primary object of the invention is to provide a small, light and relatively inexpensive flow control device which shall be capable of serving many purposes for which larger, heavier and more costly valves are now used.

It is well known that globe type valves must be employed where throttling of small percentages of the full fluid flow through a pipe is frequently required, but that such globe valves are seldom used where the flow is controlled on a full-open or shut-off basis because of the large pressure drop through the valve under such conditions.

It is equally well known that gate and plug valves are generally used where flow is to be controlled on a full-open or shut-off basis, but that such gate and plug valves are seldom used where small volumes of flow, that is, small percentages of the full flow, must be controlled.

It is another object of the invention to provide a device of the nature of a valve which shall embody a novel and improved construction, combination and arrangement of parts whereby a device shall be capable of performing the functions of both globe valves and gate or plug valves and which shall have the low pressure drop characteristic of the gate or plug valve and the superior throttling characteristic of the globe valve.

Another object is to provide a device of this characteristic which can be opened and closed easily and without a wedging action as the valve head is seated and unseated.

Still another object of the invention is to provide such a device wherein the valve head shall comprise a plurality of concentric ring sections which mutually coact and one of which coacts with the valve seat, to open and close the valve, so that the line fluid pressure tends to close the valve and the valve can be easily and gradually opened against line pressure step by step with only small operating force.

It is another object of the invention to provide a fluid control device of the general nature of a valve which shall require no valve bonnet and the body of which shall be ring like and can be connected between the usual flanges that are provided on the ends of pipe sections for connecting sections together, thereby ensuring a device that shall require a minimum of space which is particularly desirable when multiple valving is required, for example in manifolds.

A further object of the invention is to provide a valve device of the particular nature described which shall include a novel and improved operating mechanism for moving the valve head rings relatively to each other and to the valve seat and portions of which can be easily eliminated so that the valve may serve as a check valve to permit fluid flow in one direction and prevent flow in the opposite direction.

Other objects of the invention are to provide such a device which shall be simple in construction and shall require a minimum of service and maintenance attention, and to obtain other advantages and results that will be brought out by the following description in conjunction with the accompanying drawings in which—

Figure 1 is a central vertical longitudinal sectional view through a device embodying the invention connected between two pipe sections on the plane of the line 1—1 of Figure 2 and illustrating the valve in closed condition;

Figure 2 is a transverse vertical sectional view on the plane of the line 2—2 of Figure 1;

Figure 3 is a view similar to Figure 1 taken on the plane of the line 3—3 of Figure 2 which is at an angle of about 45° to the plane on which Figure 1 is taken, and illustrating the valve in full open position;

Figure 4 is a transverse vertical sectional view approximately on the plane of the line 4—4 of Figure 1;

Figure 5 is a similar view on the plane of the line 5—5 of Figure 1; and

Figure 6 is a greatly enlarged fragmentary vertical sectional view of portions of the valve head and the valve seat as illustrated in Figure 1.

Specifically describing the illustrating embodiment of the invention, the reference characters A and B designate two pipe sections arranged in end to end relation and having the respective flanges C and D rigidly secured thereto between which is clamped the body E of the device embodying the invention which we shall hereinafter refer to as a valve. As shown, packing rings or gaskets 1 are interposed between each flange and one side of the body E and bolts 2 firmly connect together the flanges C and D and clamp the body E and packing rings between the flanges.

The body E is ring-like and may be formed of a single casting having a coaxial flange 3 projecting from one side thereof at the outer end of which is an interior circumferential or annular valve seat 4 with which cooperates a valve head generally designated F which comprises a plurality of concentric ring sections 5 of different diameters such that the ring 5a of the largest diameter may enter the annular valve seat 4 while each of the other ring sections may enter the next larger ring section and the smallest ring section 5b has a solid central hub 5c which has a coaxial opening 5g therethrough in which is secured one end of an actuating rod 6, as best shown in Figure 1. For the purpose of illustration, the rod 6 has been shown as having a screw threaded connection with the hub 5c and a jamb nut 7 is screwed on the end of the rod in abutting relation to the hub. Desirably a rubber O ring packing 8 is provided between the rod and the hub 5c.

The rod 6 throughout the major portion of its length is polygonal in cross section as indicated at 6a and has its corners screw threaded as indicated at 6b; and the rod is longitudinally slidably mounted in a square opening provided in a bearing 9 which is supported by a pedestal 10 that forms a part of the body E and extends radially into said body so as to locate the opening in the bearing 9 coaxially with respect to the body and the ring sections 5 of the valve head.

Coacting with the rod 6 for moving the ring sections 5 into open position and for supporting the ring sections in positions intermediate the full-open and full-closed positions, is a support guide G which is shown as comprising a plurality of long plates 11 one end of each of which is rigidly connected to a sleeve 12 which is clamped between a shoulder 13 on the rod and the hub 5c of the innermost section 5b of the valve head. The other ends of the plates 11 are rigidly connected as by bolts 17 to a ring 15 which is connected to and supported by the outer end of the rod 6. As shown, a strap 16 is rigidly connected by bolts 17 to the ring and extends diametrically thereof and a screw 18 connects said strap to the rod 6. The plates 11 are equidistantly spaced apart circumferentially of the rod with the planes of the plates lying in radial planes of the rod; and the outer edge of each plate has a plurality of seats 19 arranged in stepped relation to each other in the respective planes of the plates, the corresponding seats of the plates lying in an imaginary circle concentric with the ring sections and of a diameter approximately corresponding to the inner diameter of one of the ring sections 5, so that said corresponding seats of each plate may slidably move into and out of the ring sections as shown in Figures 1 and 3. At the inner end of each seat 19 is a shoulder 20 for abutment with the corresponding ring section to hold the ring sections against movement under the line pressure of the fluid that flows through the device in the direction indicated by the arrows in Figure 3, and also to provide for movement of the ring sections by the plates from their closed position shown in Figure 1 to their open position shown in Figure 3. Desirably, a supplemental support ring 21 will be rigidly connected to the plates 11 to hold them against lateral deflection out of their radial planes.

Where sufficiently low operating temperatures are involved, it is desirable to utilize a rubber O ring 22 in each ring section for sealing the annular spaces between the adjacent ring sections and between the outer ring section and the valve seat. As shown, each ring section has an outer circumferential groove 23 in which the corresponding O ring 22 is seated. The O ring of the outer ring section projects out of the groove 23 so as to freely slidably engage the valve seat 4 as best shown in Figure 6, while the O ring of each of the other sections projects from its groove so as to slidably engage the inner periphery 5d of the next larger section. Each ring section also has a projection 5e such as an annular shoulder on its outer periphery, and said projection of the outer ring is adapted to abut the end of the flange 3 while said projection of each of the other ring sections is adapted to abut a seat 5f on the next outer section to limit movement of the ring sections under the line pressure into valve-closing position as shown in Figure 1.

Means is provided for positively actuating the ring sections into valve-opening position, and as shown said means includes a bevel pinion 24 having a screw threaded connection with the rod 6 and normally meshing with another bevel pinion 25 which is connected by set screws 26 to the inner end of an operating shaft 27 which passes through an opening 28 in the body E and has an enlarged portion 29 the shoulder at the outer end of which is abutted by a threaded bushing 30 for holding the shaft against longitudinal movement out of the body and the inner end of which is engaged by a suitable packing such as an O ring 31. A jamb nut 32 is provided for locking the bushing 30. It will be seen that the shaft is journaled in the opening 28 in the body, but preferably the inner end of the shaft also has a bearing which is shown in the form of a plug 33 screw-threaded into the end of the pinion 25 and having a smooth cylindrical bearing portion 36 which is journaled in an opening in the bearing 9. A stop flange 37 on the bearing 9 limits movement of the pinion 24 longitudinally of the rod 6, but there is sufficient play between the pinion and said flange to provide for longitudinal movement of the pinion and the rod 6 upstream or in the direction of the valve opening movement to permit movement of the pinion 24 out of mesh with the pinion 25 in case the pinion 25 should be operated in either direction when there is no line pressure acting on the ring sections.

Any suitable means such as the handle 37 or a power driven valve operator connected to the outer end of the shaft 27, may be provided for rotating the pinion 35. In operation of the valve in horizontal position or in vertical position with the fluid flow in a downward direction, the line pressure in the pipe will normally urge the ring sections of the valve head into valve closing position if and when the pinion 25 is rotated in the direction to withdraw the guide support G out of engagement with the ring sections as shown in Figure 1. Upon rotation of the pinion 25 in the other direction, the central or smaller section 5b of the valve head will be moved first out of contact with the next larger ring section so as to provide a small annular passage for the fluid. This operation requires only a small amount of operating force on the shaft 27 even when the line pressure is high, because the section 5b is of small area, and all of the other ring sections are held in contact with each other by the line pressure. The annular space thus created allows some fluid flow and a consequent building up of a small downstream pressure so that upon continued rotation of the pinion 25 and consequent movement of the guide support G, the next larger ring section will be engaged by its seat 19 and shoulder 20 and actuated into open position against the net difference between the upstream and downstream pressures which is less pressure than the upstream pressure alone. Continued movement of the pinion 25 and guide support G in the same direction will then cause movement of the other rings in succession so as to provide more annular flow spaces between the rings and thereby produce a progressively higher downstream pressure so that the net pressure difference at opposite sides of the ring sections diminishes continuously. Thus a minimum of operating force is required to open the valve.

The valve is closed by rotating the pinion 25 in the opposite direction so as to withdraw the guide support G out of engagement with the ring sections in sucession, beginning with the outer section 5a, the ring sections being seated under the influence of line pressure. It will be noted that most of the fluid flow between two adjacent ring sections will have been cut off by the smaller ring section entering the next larger ring section and before the rubber O-ring contacts with the outer section, and in this connection, it should be noted that preferably a beveled surface 38 is provided on each ring section and on the valve seat to guide the O rings into their sealing positions. During the closing movements of the ring sections, the O rings wipe the metal surfaces clean so as to keep the sealing surfaces clean.

The number of rings and their shape and size is selected to provide both a low pressure drop or pressure loss of the fluid in passing through the valve in its full-open position, and, as the valve moves toward its closed position, to give it close or fine control of a small percentage of the full flow through the valve by making the smallest or central ring section a proper size in relation to the basic pipe diameter.

It will be seen that the valve opens and closes easily and without any wedging action between the parts, and that the valve is small, light in weight, relatively inexpensive, occupies a minimum of space and can be used for purposes for which the known larger heavier and more costly types of valves are now employed. It will also be observed that should it be attempted to operate the valve with no line pressure in the pipe system, the pinion 24 will be thrown out of mesh with the pinion 25 so as to prevent the possibility of the guide support G being withdrawn from its supporting relation to the ring sections in such a manner as to permit the ring sections to drop from their normal position and cause a jam in any subsequent attempted operation of the valve. In this connection it will be observed that the valve should be used in a vertical pipe line with the fluid flow in the upward direction only if it is certain that pressure will continuously exist at all times that the valve is in open position.

Furthermore, it will occur to those skilled that when desired, particularly where the valve is to operate under high temperatures, the O rings could be omitted and the ring sections and valve C could be provided with mating ground valve surfaces. Furthermore, for the control of exceptionally high operating pressures the ring sections and the valve body E including the flange 3 can be made heavier and the rod guide 9 and pedestal could be easily strengthened to withstand the increased net downstream forces incident to increased pressure difference.

When the valve is controlling low flow rates, the larger ring sections are in their closed positions and the small flow is achieved through one or two of the smallest rings whose diameter is a fraction of a similar sized globe valve disk so that instead of the seating surfaces being barely cracked open and subject to erosion as would be the case in a globe an equal orifice area is achieved by one or two ring sections of small diameter in fully opened position. It will thus be seen that the successive closing of the larger ring sections has the effect of progressively smaller valves for progressively lower flow rates, with the proper relation between the size of the valve orifice and the flow rate.

It will be observed that in the fluid flow control device embodying the invention the pipe sections A and B and the body E together constitute a housing having the valve seat 4 therein; and that the valve head F comprises a plurality of coaxial circular sections of different diameter the innermost 5b of which has a solid central hub portion to which the rod 6 is connected, while the other sections are ring like with the outer periphery of the outermost section 5a formed for fluid-tight contact with the valve seat and the outer periphery of each of the other sections formed for separable fluid-tight contact with the inner periphery of the next larger section. However, an important feature of the invention is the provision of the body E with the valve seat, valve head and operating mechanism mounted therein, for connection between the flanges of two endwise juxtaposed pipe sections.

While I have shown and described the invention as embodied in the now preferred structural details, it will be understood that the construction of the valve may be widely modified and changed within the spirit and scope of the invention.

To avoid circumlocution the term "seat" is used in the following claims to include the plurality of seats 19 for any one of the sections 5 of the valve head.

What I claim is:

1. In a fluid flow control device, the combination of two pipe sections, an annular body secured between and coaxially with said pipe sections and having a coaxial annular valve seat on its inner periphery, a valve head comprising a plurality of circular sections of different diameters coaxial with said valve seat and axially movable relatively to each other and to said valve seat, the innermost of which has a solid central hub portion, while other sections are ring-like with the outer periphery of the outermost section formed for fluid-tight contact with said valve seat and the outer periphery of each of the other sections formed for separable fluid-tight contact with the inner periphery of the next larger section upon axial movement of said sections in one direction, said sections then being in valve closing position, and means mounted on said body for longitudinal movement axially of said valve seat to positively move said sections in succession in the opposite direction and apart into valve-opening position, the last-named means including a rod slidably mounted in said annular body for longitudinal but non-rotatable movement and having one end connected to said innermost section, a guide-support rigidly mounted on said rod and having seats spaced longitudinally thereof, one for each of said ring-like sections of the valve head, each seat having a portion to enter into and out of the corresponding ring-like section and to slidably engage the inner periphery thereof and having another portion to abut the downstream side of the corresponding ring-like section, and means for longitudinally moving said rod selectively in either of said directions.

2. In a fluid flow control device, the combination of two pipe sections, an annular body secured between and coaxially with said pipe sections and having a coaxial annular valve seat on its inner periphery, a valve head comprising a plurality of circular sections of different diameters coaxial with said valve seat and axially movable relatively to each other and to said valve seat, the innermost of which has a solid central hub portion, while other sections are ring-like with the outer periphery of the outermost section formed for fluid-tight contact with said valve seat and the outer periphery of each of the other sections formed for separable fluid-tight contact with the inner periphery of the next larger section upon axial movement of said sections in one direction, said sections then being in valve closing position, and means mounted on said body for longitudinal movement axially of said valve seat to positively move said sections in succession in the opposite direction and apart into valve-opening position, said sections being movable in the first-mentioned direction under the upstream pressure of the fluid, and the addition of means for stopping movement of said sections in the first-mentioned direction to said valve-closing position, including a guide-support movable axially of said valve seat and having seats spaced longitudinally thereof, one for each section, each seat having a portion to slidably engage the inner periphery of the corresponding section and having another portion to abut the downstream side of the corresponding section, and mechanism longitudinally moving said guide-support selectively in either of said directions.

3. In a fluid flow control device, the combination of two pipe sections, an annular body secured between and coaxially with said pipe sections and having a coaxial annular valve seat on its inner periphery, a valve head comprising a plurality of circular sections of different diameters coaxial with said valve seat and axially movable relatively to each other and to said valve seat, the innermost of which has a solid central hub portion, while other sections are ring-like with the outer periphery of the outermost section formed for fluid-tight contact with said valve seat and the outer periphery of each of the other sections formed for separable fluid-tight contact with the inner periphery of the next larger section upon axial movement of said sections in one direction, said sections then being in valve closing position, and means mounted on said body for longitudinal movement axially of said valve seat to positively move said sections in succession in the opposite direction and apart into valve-opening position, the outer periphery of said outermost section of the valve head having a circumferential groove and an O ring of rubber-like material therein to contact said valve seat, and the outer periphery of each of the other sections of the valve head having an exterior circumferential groove and an O ring of rubber-like material therein to contact the inner periphery of the next larger section.

4. In a fluid flow control device as defined in claim 1, said rod being screw-threaded and the last named means including a first bevel pinion threaded on said rod and rotatable but non-movable longitudinally thereof, a second bevel pinion meshing with the first bevel pinion, a shaft journaled in said annular body in radial relation to said rod and having said second bevel pinion rigidly connected thereto, the outer end of said shaft projecting outwardly from said annular body, and means connected thereto for rotating the shaft.

References Cited in the file of this patent

UNITED STATES PATENTS

| | | |
|---|---|---|
| 628,671 | Newman | July 11, 1899 |
| 760,594 | Wiesebrock | May 24, 1904 |
| 1,995,358 | Mace | Mar. 26, 1935 |
| 2,740,423 | Stillwagon | Apr. 3, 1956 |

FOREIGN PATENTS

| | | |
|---|---|---|
| 515,889 | Canada | of 1955 |